(12) United States Patent
Parthasarathy

(10) Patent No.: US 11,661,360 B2
(45) Date of Patent: May 30, 2023

(54) SYSTEM FOR REMOVING PER- AND POLYFLUORINATED ALKYL SUBSTANCES FROM CONTAMINATED AQUEOUS STREAMS, VIA CHEMICAL AIDED FILTRATION, AND METHODS OF USE THEREOF

(71) Applicant: WP&E Technologies and Solutions, LLC, Flowery Branch, GA (US)

(72) Inventor: Harikrishnan Parthasarathy, Flowery Branch, GA (US)

(73) Assignee: WP&E TECHNOLOGIES AND SOLUTIONS, LLC, Flowery Branch, GA (US)

( * ) Notice: Subject to any disclaimer, the term of this patent is extended or adjusted under 35 U.S.C. 154(b) by 44 days.

(21) Appl. No.: 17/183,333

(22) Filed: Feb. 23, 2021

(65) Prior Publication Data

US 2021/0395117 A1    Dec. 23, 2021

Related U.S. Application Data

(60) Provisional application No. 63/041,099, filed on Jun. 18, 2020.

(51) Int. Cl.
  *C02F 1/52*    (2023.01)
  *B01D 21/01*    (2006.01)
  (Continued)

(52) U.S. Cl.
  CPC ............ *C02F 1/5245* (2013.01); *B01D 21/01* (2013.01); *C02F 1/004* (2013.01); *C02F 1/5281* (2013.01);
  (Continued)

(58) Field of Classification Search
  None
  See application file for complete search history.

(56) References Cited

U.S. PATENT DOCUMENTS

| | | |
|---|---|---|
| 5,277,981 A | 1/1994 | Haider et al. |
| 6,787,038 B2 | 9/2004 | Brusseau et al. |
| | (Continued) | |

FOREIGN PATENT DOCUMENTS

| | | |
|---|---|---|
| CA | 3043821 C | 2/2021 |
| CN | 100347137 C | 11/2007 |
| | (Continued) | |

OTHER PUBLICATIONS

Machine translation of JP-2017064653-A, pp. 1-5. (Year: 2017).*
International Search Report for application No. PCT/US2021/019305, dated May 19, 2021.

*Primary Examiner* — Clare M Perrin
(74) *Attorney, Agent, or Firm* — Carlo Julio Salas; Maynard Nexsen, PC

(57) ABSTRACT

A system comprising an agitation and flocculation system and a particulate filter capture system, and optionally a feedback system and/or a water softening. The agitation and flocculation system configured to receive a contaminated aqueous stream and an anhydrite quantity, and comprising means for agitating the aqueous stream and a means for mixing the aqueous stream with the anhydrite, such that a precipitate of calcium sulfate hydrate+contaminant complexes is formed. Also, a system comprising a fixed-bed type cross-flow system and a particulate filter capture system, and a corresponding method of removing per- and polyfluorinated alkyl substances from the contaminated aqueous stream. The method comprising the acts of: providing an anhydrite quantity; contacting and agitating the anhydrite quantity with a contaminated aqueous stream; and collecting (Continued)

the precipitate of calcium sulfate hydrate+contaminant complexes formed from the aqueous stream.

16 Claims, 3 Drawing Sheets

(51) Int. Cl.
    *C02F 1/00*     (2023.01)
    *C02F 9/00*     (2023.01)
    *B03D 3/06*     (2006.01)
    *C02F 1/28*     (2023.01)
    *C02F 11/12*     (2019.01)
    *C02F 101/36*     (2006.01)

(52) U.S. Cl.
    CPC ............... *C02F 9/00* (2013.01); *B03D 3/06* (2013.01); *C02F 1/281* (2013.01); *C02F 11/12* (2013.01); *C02F 2101/36* (2013.01)

(56) References Cited

U.S. PATENT DOCUMENTS

| | | |
|---|---|---|
| 8,080,158 B2 | 12/2011 | Lee et al. |
| 8,628,659 B1 | 1/2014 | Taylor, III |
| 9,694,401 B2 | 7/2017 | Kerfoot |
| 2012/0277516 A1 | 11/2012 | Ball |
| 2012/0285893 A1* | 11/2012 | Moore ............... C02F 1/52 210/723 |

FOREIGN PATENT DOCUMENTS

| | | | | |
|---|---|---|---|---|
| CN | 101884831 A | 11/2010 | | |
| CN | 102145932 B | 7/2012 | | |
| CN | 103058319 B2 | 6/2014 | | |
| CN | 105271501 A2 | 1/2016 | | |
| DE | 4006435 C2 | 2/1995 | | |
| DE | 102014119238 A1 | 6/2016 | | |
| JP | 4059506 B2 | 3/2008 | | |
| JP | 2017064653 A | * | 4/2017 | |
| JP | 2017064653 A | | 4/2017 | |
| WO | WO2000042073 A1 | 7/2000 | | |
| WO | WO-0107370 A1 | * | 2/2001 | ......... B01D 21/0045 |
| WO | WO2004071960 A2 | 8/2004 | | |
| WO | WO2012177526 A2 | 12/2012 | | |
| WO | WO2013016775 A1 | 2/2013 | | |
| WO | WO 2018/027273 A1 | 2/2018 | | |
| WO | WO2019051208 A1 | 3/2019 | | |
| WO | WO2019113268 A1 | 6/2019 | | |
| WO | WO2020005966 A1 | 1/2020 | | |

\* cited by examiner

SYSTEM FOR REMOVING PER- AND POLYFLUORINATED ALKYL SUBSTANCES FROM CONTAMINATED AQUEOUS STREAMS, VIA CHEMICAL AIDED FILTRATION, AND METHODS OF USE THEREOF

BACKGROUND OF THE INVENTION

Technical Field

The present invention generally relates to filtration systems. More specifically, the present invention generally relates to a chemical-aided filtration system for, and method of, removing per- and polyfluorinated alkyl substances from a contaminated aqueous stream.

The present invention also generally relates to sustainable water management for aqueous streams, water-reserves, and aquifers. These "waters" may be associated with industrial or consumer-good manufacturing processes, or the waters may be independent from industrial or consumer manufacturing processes (i.e., the waters may be natural but contaminated water-reservoirs or aquifers, or may be contaminated municipal or agricultural water bodies or streams, for example), all together referred to herein as "aqueous streams". The sustainable water management realized by the present invention also may encompass open water treatments and treatment systems for, but not limited to, lakes, reservoirs, rivers, ponds, and streams.

The present invention also generally relates to a system for and method of producing or reducing the inputs, especially harsh inputs, necessary for aqueous stream processing. These inputs may be (1) energy, (2) fresh water, or (3) the active ingredients necessary for adequate processing, for example. The present invention also generally relates to reducing the non-useful, or potentially toxic, outputs from the aqueous stream processing. These outputs may be residues laden with unrecovered or unrecycled per- and polyfluorinated alkyl substances that are usually too difficult to capture.

Prior Art

Per- and polyfluorinated alkyl substance (PFAS) contaminated fluid streams primarily are generated from two main sources: firefighting foam and industrial discharges. For example, for decades, the United States (U.S.) Department of Defense (DoD) contracted for the Military to use firefighting foam containing PFASs to fight fuel-fires in training exercises at bases around the country. U.S. commercial airports also used PFAS-containing foam or aqueous-film forming foam (AFFF). AFFF is intended to be directly discharged into the environment, where it is used to fight fires, such as at an airfield training exercise. PFASs also are found in countless consumer products like non-stick pans (e.g., pans with TEFLON-like coatings or polytetrafluoroethylene, PTFE or PTFT), food packing, waterproof liners and fabrics, textile coatings and sprays for water, grease, and stain resistance or repellence, in personal care products like waterproof mascaras, eyeliners, and sunscreen, in shampoos and shaving creams, and in the associated industrial processes for the production of these products.

Consequently, PFASs represent an interesting, growing, increasingly diverse inventory of chemicals for the general public, scientific researchers, and regulatory agencies worldwide. Precise knowledge of the presence, concentration, interactions, and effects of all PFASs in a given contaminated unit is difficult if not impossible due to a lack of consensus definitions in the field and due to the miniscule scales at which PFAS exist. Data-gathering, testing, and environmental monitoring exercises have led to the publication and sharing of various lists of PFASs, some exceeding several thousand substances in length. For example, the U.S. Environmental Protection Agency (EPA) National Center for Computational Toxicology has curated a list of PFASs based on environmental occurrence (through literature reports and analytical detection, for example,) and manufacturing process data, as well as lists of PFAS chemicals procured for testing within EPA research programs. The consolidated list contains about 6,330 PFAS Chemical Abstracts Services (CAS) named substances, with about 5,264 represented with a defined chemical structure. There is no precisely clear definition of what constitutes a PFAS substance, given the inclusion of partially fluorinated substances, polymers, and ill-defined reaction products; hence, the following serves as a non-limiting representative grouping of substances spanning and bounded by the below representative lists, defining a practical boundary for the PFAS chemical space at the time of this disclosure:

https://comptox.epa.gov/dashboard/chemical_lists/ EPAPFASRL is a manually curated cross-agency research list of mainly straight-chain and branched PFASs compiled from various internal, literature, and public sources by EPA researchers and program office representatives (note that this list includes a number of parent, salt and anionic forms of PFAS, the latter being the form detected by mass spectroscopic methods), and that these different forms are assigned unique DTXSIDs, with a unique structure, CAS (if available) and name, but will collapse to a single form in a structural representation observed using high resolution mass spectrometry (HRMS) (MS-ready structure representations) or in a structure representation observed using quantitative-structure-activity-relationship (or QSAR-ready);

https://comptox.epa.gov/dashboard/chemical_lists/ EPAPFASINV is a PFAS list of the EPA's ToxCast chemical inventory, and consists of chemicals successfully procured from commercial suppliers (with a small number provided by National Toxicology Program partners) and deemed suitable for testing (i.e., solubilized in DMSO above 5 millimolar and not gaseous or highly reactive), with all or a portion of this inventory being made available to EPA researchers and collaborators to be analyzed and tested in various high-throughput screening (HTS) and high-throughput toxicity (HTT) assays;

https://comptox.epa.gov/dashboard/chemical_lists/ EPAPFAS75S1 list is a PFAS list corresponding to seventy-four (74) unique substances (DTXSID3037709, Potassium perfluorohexanesulfonate duplicated in set, procured from two different suppliers) selected based on a prioritization scheme that considered EPA Agency priorities, exposure/occurrence considerations, availability of animal or in vitro toxicity data, and ability to procure in non-gaseous form and solubilize samples in dimethyl sulfoxide; expanded PFAS list of the EPA's ToxCast chemical inventory, and consists of chemicals that are determined to be insoluble in DMSO above about 5 mM, wherein said chemicals were procured from commercial suppliers (with a small number provided by National Toxicology Program partners) and were deemed unsuitable for testing due to limited DMSO solubility;

https://comptox.epa.gov/dashboard/chemical_lists/PFA-SOECD is a new comprehensive global database list of PFASs compiled from the Organization for Economic Co-operation and Development (OECD) listing more than fourthousand seven-hundred (4700) new PFASs, including several new groups of PFASs that fulfill the common definition of PFASs (i.e., they contain at least one perfluoroalkyl moiety) but have not yet been commonly regarded as PFASs;

https://comptox.epa.gov/dashboard/chemical_lists/PFASKEMI is a PFAS list of the KEMI Swedish Chemicals Agency Report 7/15 (provided by Stellan Fischer), and consists of highly fluorinated substances and alternatives (2015);

https://comptox.epa.gov/dashboard/chemical_lists/PFAS-TRIER is an international community public list of PFASs compiled by a community effort including Xenia Trier, David Lunderberg, Graham Peaslee, Zhanyun Wang and colleagues, EPA's Dashboard team, the NORMAN Suspect List Exchange in 2015;

https://comptox.epa.gov/dashboard/chemical_lists/EPAPFASCAT is a list of registered DSSTox "category substances" representing PFAS categories created using ChemAxon's Markush structure-based query representations, wherein the markush categories can be broad and inclusive of more specific categories or can represent a unique category not overlapping with other registered categories, and wherein for each PFAS category registered with a unique DTXSID considered a generalized substance or "parent ID" that can be associated with one or many "child IDs" (i.e. many parent-child mappings) within the full DSSTox database; and https://comptox.epa.gov/dashboard/chemical_lists/PFAS-STRUCT is a list of all PFAS structures containing a defined substructure of RCF2CFR'R" (R cannot be H).

Generally, PFASs, also known as per- and polyfluoroalkyl substances, are synthetic organofluorine or perfluorinated chemical compounds that have multiple fluorine atoms attached to an alkyl chain. As such, the average member of the group contains at least one perfluoroalkyl moiety, —$C_nF_{2n}$—. A subgroup of PFASs—the fluorosurfactants or fluorinated surfactants—are a group of surfactants having a fluorinated "tail" and a hydrophilic "head". The subgroup includes the perfluorosulfonic acids such as the perfluorooctane sulfonate (PFOS) and the perfluorocarboxylic acids such as the perfluorooctanoic acid (PFOA). PFOS and PFOA were the most highly used and most highly distributed PFASs in the U.S until recently.

A number of environmental studies have been conducted or are being conducted into the effects of PFAS contaminated fluid streams. The concluded studies tend to indicate that about 95% of the U.S. population has PFASs in their body, with further study recommended. The concluded studies also indicate that PFASs have contaminated tap water for at least about 16 million people in about 33 states and Puerto Rico, and has contaminated groundwater in at least about 38 states.

There are no known studies to show that swimming or bathing in water containing PFOS or PFOA, for example, can be harmful to human health. Further, PFOS and PFOA are not easily absorbed through the skin, and accidentally swallowing contaminated water while bathing or swimming will not result in a significant exposure. However, due to their persistence, possible toxicity, risk of bio-accumulation, and widespread occurrence in the bodies of the general population and wildlife at large, fluorosurfactant PFASs such as PFOS, PFOA, and perfluorononanoic acid (PFNA) already have caught the attention of regulatory agencies across the globe.

There are two dominant attributes of PFASs that make the class of chemicals especially concerning: 1) PFASs are characterized by a carbon-fluorine (C—F) backbone; and 2) the carbon fluorine bond is one of the most stable bonds in organic chemistry, giving PFASs a relatively long environmental half-life. PFASs do not rapidly break down in water or soil and readily are carried over great distances by wind and water currents. Humans are readily exposed to PFASs in the air, in indoor dust, food, and water; and in some consumer products. The main source of human exposure to PFASs usually is from eating food and drinking water that has been contaminated.

As a result of this concern, the production of certain PFASs are regulated by various governments across the world, or have been unilaterally phased-out by international manufacturers like 3M, DuPont, Daikin, and Miteni in the US, Japan, and Europe. For example, 3M already has replaced PFOS and PFOA with short-chain PFASs like perfluorohexanoic acid (PFHxA), perfluorobutanesulfonic acid, and perfluorobutane sulfonate (PFBS). Although short-chain fluorosurfactant PFASs may be less prone to bio-accumulation, concerns remain that short-chain PFASs may be harmful to both humans and the environment at large.

Several technologies currently are available for remediating PFASs in aqueous streams. These technologies are applicable to drinking-water supplies, groundwater, industrial wastewater, surface water, and other miscellaneous applications (such as landfill leachate processing). Influent concentrations of PFASs may vary by orders of magnitude over time for specific media or applications, and these variable influent concentrations, along with other general water quality parameters (e.g., pH) may influence the performance and operating costs for each specific treatment technology.

One technology commonly used for the removal of various PFASs from an aqueous stream is activated carbon adsorption. Activated carbon treatment or adsorption is used to adsorb natural organic compounds, taste and odor compounds, and synthetic organic chemicals in drinking-water supplies, for example. PFAS adsorption occurs at the interface between the liquid and solid phase. Activated carbon is an effective solid adsorbent, as it is a highly porous material and provides a large surface area upon which contaminants may be adhered. Activated carbon usually is made from organic materials with high carbon contents such as wood, lignite, and coal, and often is used in a granular form called granular activated carbon (GAC), powdered activated carbon, or biochar.

A person having ordinary skill in the art understands that the cost of activated carbon treatment, including the cost of handling the spent activated carbon waste, is high due to the high amounts of activated carbon needed for filtration and the high amounts of waste generated from the spent carbon after exhaustion and disposal of the hazardous waste. The footprint per flow of the average activated carbon treatment facility also is high due to the carbon filtration needing a contact time of about five to seven minutes, which result in large size unit or volume of vessels for required flow. For example, a 100 gallon per minute system needs about a 500 gallon to a 700 gallon filtration vessel capacity.

Another technology commonly used for the removal of various PFASs from an aqueous stream is ion exchange or resin exchange. Ion exchange resins are made up of highly porous, polymeric material(s) that is/are acid, base, or water insoluble. The tiny beads that make up the resin often times are made up of hydrocarbons. There are two broad categories of ion exchange resins: cationic and anionic. The negatively charged cationic exchange resins (CER) are effective at removing positively-charged contaminants, and the positively charged anion exchange resins (AER) are effective at removing negatively-charged contaminants, like PFASs. Ion exchange resins are characterized as tiny and powerful magnets that attract and hold the target contaminant material from passing with the aqueous stream. In practice, the negatively charged PFAS ions are attracted to the positively charged anion resins. AER has shown to have a high capacity for many PFAS; however, it is typically more expensive than GAC at an equally large footprint per flow. Once exhausted, the ion exchange beds typically are regenerated with caustic or alkaline liquid solutions, which generate alkaline PFAS contaminated waste streams that must be processed at high risk and cost.

Another technology commonly used for the removal of various PFASs from an aqueous stream is membrane filtration. High-pressure membranes, such as nanofiltration membranes or reverse osmosis membranes, for example, are effective at removing PFASs. Reverse osmosis membranes are more selective than nanofiltration membranes; therefore, membrane filtration technology depends on membrane permeability characteristics and selectivity. A standard difference between nanofiltration and reverse osmosis technology is that a nanofiltration membrane will reject hardness to a high degree (i.e., will soften by removing polyvalent cations), but will pass sodium chloride, for example. A reverse osmosis membrane, on the other hand, will reject all salts to a high degree. Consequently, nanofiltration membranes may remove particles and particulates while retaining minerals, which reverse osmosis membranes would likely capture.

Research shows that high-pressure membranes typically are more than about 90% effective at removing a wide range of PFASs, including short-chain PFASs. Despite the high-pressure membrane's effectiveness at removing PFASs, approximately 20% of the feedwater—the water coming into the high-pressure membrane system—is retained as a concentrated waste that must be handled, processed, and ultimately disposed of. A person having ordinary skill in the art understands that a concentrated waste stream at 20 percent of the feedwater is difficult and costly to handle especially when the concentrated waste is loaded in PFASs. For example, the associated operating costs are an order of magnitude greater than that of GAC or ion exchange systems.

It is, therefore, desirable to overcome the deficiencies of, and provide for improvements to, the state of the prior art. Thus, there is a need in the art for a system and method for removing PFASs from a contaminated aqueous stream that provides a more efficient and effective system for solving the problems in the art and improving the state of the art.

Accordingly, there is now provided within this disclosure a system and method of use for overcoming the aforementioned difficulties and longstanding problems inherent in the art. A better understanding of the principles and details of the present invention will be evident from the following detailed description.

BRIEF SUMMARY OF THE INVENTION

Exemplary embodiments are directed to a system for removing per- and polyfluorinated alkyl substances from a contaminated aqueous stream. In one exemplary embodiment, the system comprises an agitation and flocculation system and a particulate filter capture system.

Optionally, the system may comprise a feedback system configured to consider the concentration of at least one of a group consisting of perfluoroalkylcarboxylic acids, perfluoroalkyl sulfonates, perfluoroalkyl-sulfonic acids, and perfluorosulfonamidoacetic acids in the aqueous stream, and the concentration of at least one of the group consisting of perfluoroalkylcarboxylic acids, perfluoroalkyl sulfonates, perfluoroalkyl-sulfonic acids, and perfluorosulfonamidoacetic acids in the decontaminated aqueous stream exiting the system—to make efficient use of the anhydrite quantity introduced into and used by the system. As another option, the system also may comprise a water softening system for softening the decontaminated aqueous stream exiting the system.

The agitation and flocculation system is configured to receive an aqueous stream contaminated with contaminants, and configured to receive an anhydrite quantity as a primary flocculant. In certain exemplary embodiments, the anhydrite quantity comprises solid anhydrite particles or granules—either pre-hydrated or dry or a combination thereof. In other exemplary embodiments, the anhydrite quantity is introduced into the aqueous stream via a liquid carrier.

The agitation and flocculation system comprises a means for agitating the aqueous stream and a means for mixing the aqueous stream with the anhydrite, such that effectively positively charged calcium ions hydrate from the anhydrite and interact with the negatively charged contaminants to form a precipitate of calcium sulfate hydrate+contaminant complexes in the aqueous stream. The agitation and flocculation system also is configured to cease agitating and mixing the aqueous stream such that a portion of the calcium sulfate hydrate+contaminant complexes settle or are redirected under the influence of gravity, and such that a portion of the calcium sulfate hydrate+contaminant complexes resist the influence of gravity and remain suspended in a partially decontaminated aqueous stream. In certain exemplary embodiments, the agitation and flocculation system comprises at least one from a group consisting of stirring blades, baffles, vortex generators, liquid flow devices, and gas or air pumps for bubbles or microbubble generation, to increase the kinetics between the aqueous stream and the anhydrite quantity.

In another exemplary embodiment, the system comprises a fixed-bed type cross-flow system and a particulate filter capture system. The fixed-bed type cross-flow system may be configured as a fixed-bed type cross-flow filter system comprising a cartridge-type filter media comprising the anhydrite quantity. The fixed-bed type cross-flow system also may be configured and structured to have the agitation and flocculation system downstream of the fixed-bed type cross-flow system and upstream of the particulate filter capture system.

To go along with the illustrative and exemplary systems, exemplary embodiments of the present invention are directed to a method of removing per- and polyfluorinated alkyl substances from a contaminated aqueous stream. In one exemplary embodiment, the method comprises the acts of: providing an anhydrite quantity; contacting the anhydrite quantity with an aqueous stream contaminated with contaminants; increasing the kinetics of the anhydrite quantity in contact with the aqueous stream such that effectively positively charged calcium ions hydrate from the anhydrite and interact with the negatively charged contaminants to form a precipitate of calcium sulfate hydrate+contaminant complexes in the aqueous stream; and collecting the precipitate of calcium sulfate hydrate+contaminant complexes from the aqueous stream.

In certain exemplary embodiments, the collecting act comprises capturing the calcium sulfate hydrate+contaminant complexes in the aqueous stream via a particulate filter capture system comprising filter media. Further, the collecting act may comprise drying the captured calcium sulfate hydrate+contaminant complexes, or processing the dried captured calcium sulfate hydrate+contaminant complexes via techniques like, but not limited to, milling, grinding, and pulverizing the dried captured calcium sulfate hydrate+contaminant complexes.

BRIEF DESCRIPTION OF THE DRAWINGS

In the figures, like reference numbers refer to like parts throughout the various views unless otherwise indicated. For reference numbers with letter character designations such as "102A" or "102B", the letter character designations may differentiate two like parts or elements present in the same figure. Letter character designations for reference numbers may be omitted when it is intended that a reference numeral to encompass all parts having the same reference number in all figures.

DETAILED DESCRIPTION OF THE INVENTION

Figure 1:
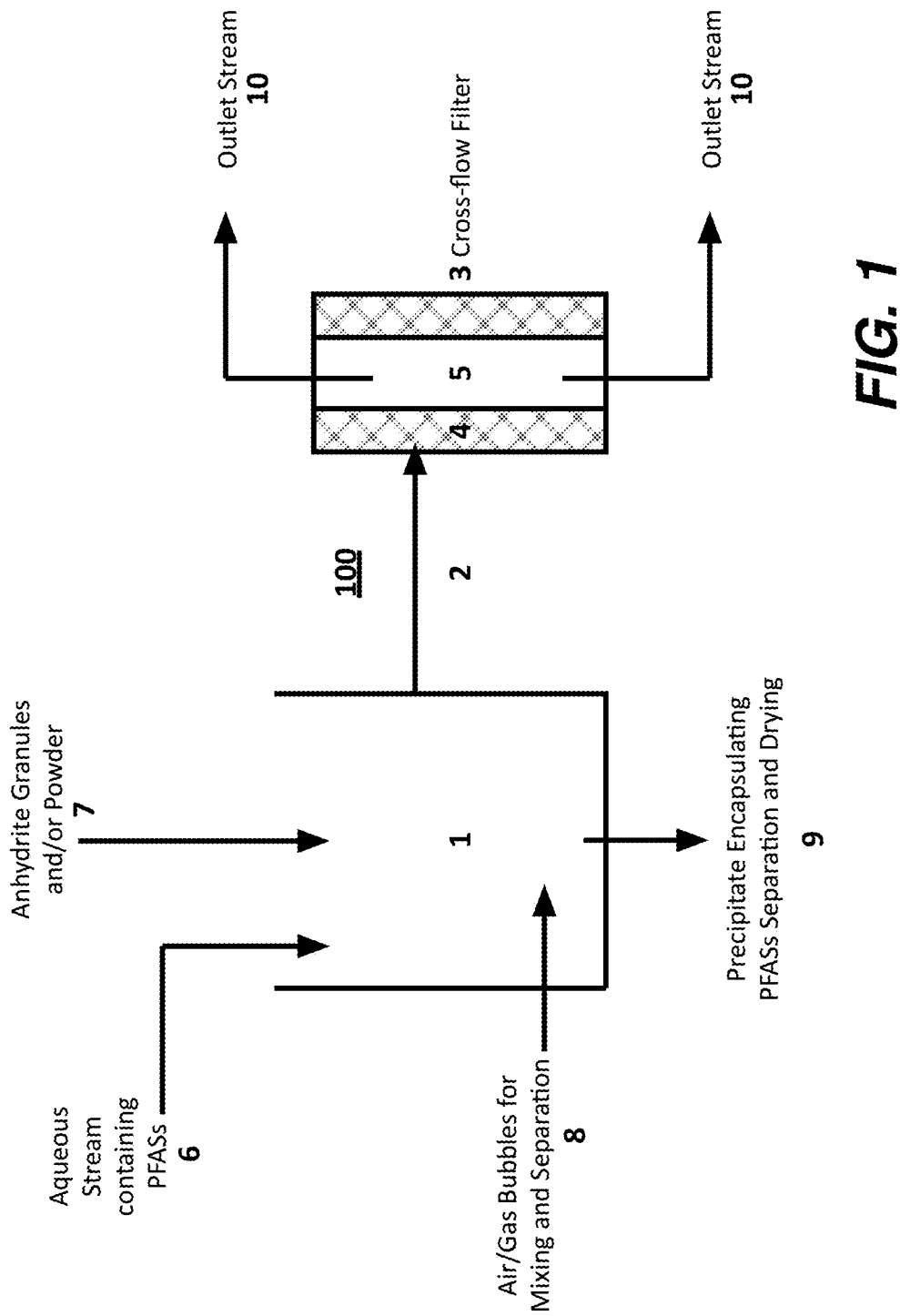
FIG. 1 is a schematic diagram of a first exemplary embodiment of a system for removing PFASs from a PFAS contaminated aqueous stream.

For a further understanding of the nature, function, and objects of the present invention, reference should now be made to the following detailed description taken in conjunction with the accompanying drawings. While detailed descriptions of the preferred embodiments are provided herein, as well as the best mode of carrying out and employing the present invention, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner. The practice of the present invention is illustrated by the included Example, which is deemed illustrative of both the process taught by the present invention and of the results yielded in accordance with the present invention.

As used herein, the word "exemplary" or "illustrative" means "serving as an example, instance, or illustration." Any implementation described herein as "exemplary" or "illustrative" is not necessarily to be construed as preferred or advantageous over other implementations.

Embodiments and aspects of the present invention provide an efficient, effective, and economical filtration system for removing PFASs from contaminated aqueous streams. The inventive concepts described herein also provide a solution that is not susceptible to the limitations and deficiencies of the prior art. The inventive concepts described herein lessen the operating-costs, capital expenditures, and/or infrastructure associated with the removal of PFASs from contaminated aqueous streams.

A first exemplary embodiment of the present invention provides a system for and a method of removing PFASs from PFAS contaminated aqueous streams via chemical aided capture and filtration. The system and method is configured to process PFAS contaminated aqueous streams without need for activated carbon filters or equivalent. The system and method also is configured to reduce operating costs, between about 30% to about 40% when compared to activated carbon filtration systems and ion exchange resin systems, and between about 50% to about 70% when compared to other prior art treatment processes such as reverse osmosis.

In particular, the system and method reduces the non-useful, or potentially toxic, outputs from PFAS processing. The system and method also efficiently and effectively treats and decontaminates aqueous streams, with limited bi-products and/or residues that cannot be captured, filtered, and/or reused, recycled, or safely disposed of, and with limited quantities of new or fresh waste materials or reagents. Further, the system and method also efficiently and effectively treats and decontaminates the aqueous stream without need for any secondary pH adjustment pre-treatment steps.

Specifically, prior art carbon filtration, membrane filtration, or ion exchange methods are very susceptible to fluctuations in pH, temperature, salinity, and/or the presence of any other type of organics in addition to PFAS/PFOS. The system and method of the present disclosure—unlike carbon filtration or membrane filtration or ion exchange—works on a wide range of pH values for the aqueous stream, between about 4 to about 11, and a wide range of temperatures from between about 32 degrees Fahrenheit (F) to about 90 degrees F., and wide range of salinity levels of up to about 32,000 parts per million (ppm), and are not affected by the presence of organics. Outside of these ranges, the system and method 100 may operate with known modifications and/or pre-conditioning and/or post-conditioning steps for the stream.

A second exemplary embodiment of the present invention provides a transportable and/or stand-alone system, and associated method, that can be deployed on an emergency or quick response basis to purify PFAS contaminated aqueous streams emitted from chemical processing and/or manufacturing facilities, or emitted as chemical runoff and/or leachate. The system and method is configured to substantially purify, or nearly-completely purify, PFAS contaminated aqueous streams laden with, amongst others, PFOS, PFOA, and any combinations thereof. The PFAS contaminated aqueous stream may be laden with various PFAS-types of measurable and unmeasurable quantities—due to the current state of deployable technology and/or the sometimes extreme dilution of the contaminated stream—and other similarly structured and charged contaminants. Yet the system and method is proven to capture commonly measurable PFAS-types (perfluoroalkyl carboxylic acids, perfluoroalkyl sulfonates, perfluoroalkyl sulfonic acids, and perfluorosulfonamidoacetic acids, for example) that directly facilitate capture of the—usually unmeasurable—other PFAS-types commonly associated with the contaminated stream and other similarly structured and charged contaminants.

A third exemplary embodiment of the present invention provides a transportable, stand-alone system, and associated method, configured to be mounted on a trailer or skids that can be deployed on an emergency or quick response basis, to purify PFAS contaminated fluid streams. The system and method allows chemical processing and manufacturing facilities, having internal cleanup issues, for example, to quickly purify or nearly-completely purify FPAS contaminated aqueous streams. The system and method also allows municipalities, governments, and localities, as well as private consumers to purify or nearly-completely purify PFAS contaminated aqueous streams. Once the issues in the facility or locality are fixed, the system and method may be remobilized and removed from the site in a short period of time. The system also easily may be remobilized or ramped up within a short period of time, as needed.

A fourth exemplary embodiment of the present invention provides a chemical aided capture and filtration system and method—involving the use of anhydrous calcium sulfate or anhydrite (Drierite©, for example) as a flocculant or precipitation and agglomeration agent—for the removal of PFASs from a PFAS contaminated aqueous stream. PFASs tend to have negatively charged functional groups, while the anhydrite in the aqueous stream yields positively charged calcium ions. The anhydrite generally exhibits limited solubility in water and exhibits retrograde solubility, i.e., the solubility decreases as temperature increase.

As such, the positively charged calcium ions from the hydrated anhydrite interacts with at least some of the negatively charged groups PFASs—such that the buoyancy/weight of these PFASs in the aqueous stream is affected—which causes the calcium sulfate hydrate+PFAS complexes to precipitate. The insoluble calcium sulfate hydrate+PFAS complexes also will begin to agglomerate, which directly facilitates substantial capture of the other PFASs in the contaminated stream that may be of a type that do not interact with the positively charged calcium ions but would, nonetheless, still be bound-up by the calcium sulfate hydrate+PFAS complexes as they precipitate and/or agglomerate.

In this way, the system and method leverages flocculation, sedimentation, and/or filtration to purify the PFAS contaminated aqueous stream. In particular, the system and method may leverage flocculation and sedimentation—through gravity-induced settling of the calcium sulfate hydrate+PFAS insoluble precipitate complexes. In certain embodiments, the system and method then leverage filtration to filter out from the aqueous stream any un-sedimented or un-precipitated agglomerated calcium sulfate hydrate+PFAS complexes along with their bound-up or captured secondary PFASs—which secondarily flock onto the agglomerated calcium sulfate hydrate+PFAS complexes. As such, the system and method is configured to process PFAS contaminated aqueous streams without need for activated carbon filters, ion exchange systems, reverse osmosis systems, membrane systems, or equivalent—although further processing of the aqueous stream would yield further purification and decontamination without the limitations reported in the prior art.

Accordingly, further downstream processing under similar principles as explained herein—using other hydrated forms of calcium sulfate like $CaSO_4 \cdot 2\,H_2O$ or gypsum and selenite (a mineral dihydrate of calcium sulfate), $CaSO_4 \cdot \frac{1}{2} H_2O$ or basanite (a hemihydrate, also known as plaster of Paris, either α-hemihydrate and β-hemihydrate of calcium sulfate), bauxite, alumina, and/or alum, etc.—would yield further purification and decontamination without the limitations reported in the prior art. Further, the system and method result in a captured solid waste that more easily can be processed, transported, and disposed of than the activated-chemical, liquid, or wet-waste of the prior art.

With the above context in mind, embodiments and aspects of the present invention become apparent from the drawings and the following detailed description.

FIG. 1 is a schematic diagram of a fifth exemplary embodiment of the present invention. FIG. 1 illustrates a generalized system-structure and method steps 100 for removing PFASs from a PFAS contaminated aqueous stream. The system 100 has as much as 95% lower waste generation side-effects when compared to an integrated activated carbon filter.

For example, in comparison to an activated carbon system used for PFAS removal, for 1 pound of PFAS compounds removed from the aqueous stream, the estimated cost of activated carbon is about $450 U.S. dollars including cost of new activated carbon, replacement of spent carbon, and waste disposal of the spent carbon. This generates about 101 pounds of waste to be disposed of. In stark contrast, the system 100, for the same 1 pound of PFAS compounds removed from the aqueous stream, the estimated cost is around $100 U.S. dollars including consumables and disposal. This is about 75% reduction in estimated operating costs. The system 100 also generates less than about 7 pounds of waste, which is more than about 90% waste reduction. Further, the footprint of the system 100 is about 50% smaller than activated the carbon system, to achieve the same performance.

For purposes of the system 100 and the associated method, the PFAS contaminated feedwater 6 is fed initially into a primary agitation and flocculation tank 1. The feedwater 6 is fed via a pump, by gravity flow, by any other equivalent, or by any other method known to a person having ordinary skill in the art. Although the primary agitation and flocculation tank 1 is shown as a single tank, it is envisioned that the agitation and flocculation may occur along a series of interconnected and interrelated tanks, or any other system known to a person having ordinary skill in the art for inducing mixing, agitation, aggregation, precipitation, agglomeration as between the contaminated feedwater 6 and the flocculant, and/or any other common additive, to be introduced into the system 100.

In particular, the primary agitation and flocculation tank 1 is configured to receive the PFAS contaminated feedwater 6 and a quantity of anhydrite 7 as the primary flocculant. The quantity of anhydrite 7 may be introduced into the feedwater 6 as solid particles or granules, either hydrated or dry, as a liquid mixture, or as a fixed bed of material within the tank(s) (see FIG. 2; system 200). The quantity of anhydrite 7 also may be determined by a feedback system, which takes into consideration the concentration of at least one of the measurable PFASs in the feedwater 6 (perfluoroalkyl carboxylic acids, perfluoroalkyl sulfonates, perfluoroalkyl sulfonic acids, and/or perfluorosulfonamido-acetic acids, for example) and the measurable concentration of a least one of the measurable PFASs in the final outlet treated aqueous stream 10 of the system 100, to make most efficient use of the quantity of anhydrite 7 introduced into and used by the system 100. The feedwater 6 may flow through, or function as the inlet feed liquid, for the quantity of anhydrite 7.

Further, the primary agitation and flocculation tank 1 is configured, and has the necessary structure(s), for mixing and agitating the feedwater 6 with the added quantity of anhydrite 7 as flocculant. The tank 1 may have stirring blades, baffles, or equivalent structures, may rely on vortex generators or liquid flow devices to increase the kinetics between the PFAS contaminated feedwater 6 and the anhydrite 7 mixture, or may rely on pumps introducing gas or air into the mixture within the tank 1. The tank 1, specifically, is configured to receive compressed or uncompressed gas or air, and to form gas bubbles or microbubbles 8 in the feedwater 6 and the anhydrite 7 mixture.

With the feedwater 6 and the anhydrite 7 mixed and agitated in the primary agitation and flocculation tank 1, the generally insoluble anhydrite begins to hydrate and release the positively charged calcium ions in the PFAS contaminated feedwater 6. The negative charge of the PFASs interacts with the effectively positively charged and hydrated anhydrite to form calcium sulfate hydrate+PFAS complexes in the feedwater 6 within the tank 1. As the insoluble calcium sulfate hydrate+PFAS complexes begin to agglomerate, they also begin to precipitate. Together, this directly facilitates substantial capture of the other PFASs in the feedwater 6 that may be of a type that do not/are not known to/have not been evidenced yet to interact with the positively charged calcium ions but would, nonetheless, still be bound-up by the calcium sulfate hydrate+PFAS complexes as they precipitate and/or agglomerate.

Upon cessation of the mixing and agitation of the feedwater 6 and the anhydrite 7 mixture in the tank 1, the calcium sulfate hydrate+PFAS complexes begin to settle under the influences of gravity, along with their bound-up or captured secondary PFASs (which secondarily flock onto the agglomerated calcium sulfate hydrate+PFAS complexes, as explained in detail herein). The calcium sulfate hydrate+PFAS complex(es), having a greater weight and different structure than the component parts, begin to either precipitate or aggregate and form a solid deposit. As the barriers to aggregation are reduced by the nature of calcium sulfate hydrate+PFAS complex, the calcium sulfate hydrate+PFAS complexes begin to agglomerate to form floc or flakes which further precipitate. Some complexes resist precipitation and remain suspended in the feedwater 6. Those calcium sulfate hydrate+PFAS complexes 9 that do precipitate are then separated from the remainder of the liquid phase in the tank 1, for further processing and drying, and for collection and disposal. The calcium sulfate hydrate+PFAS complexes 9 are characterized as a generally insoluble calcium salt.

Despite the chemical-aided capture of the majority of the PFASs in the feedwater 6, the remainder of the liquid phase in the tank 1, after collection of the precipitant 9, likely contains trace amounts of unprecipitated calcium sulfate hydrate+PFAS complexes. The residual calcium sulfate hydrate+PFAS complexes, nonetheless, are larger in size than the component parts, which makes them easier to capture physically or mechanically, e.g., makes them easier to simply filter-capture in a particulate filter without need for activated carbon filter systems or adsorbent beds, etc. The system 100 and the entire method from start to finish including precipitation and physical/mechanical capture removes upwards of 99.9 percent of the PFASs in the liquid phase.

More specifically, the remainder of the liquid phase in the tank 1, after collection of the precipitate 9, and containing trace amounts of unprecipitated calcium sulfate hydrate+PFAS complexes, is passed into 2 a cross-flow filter system 3. The cross-flow filter system 3 of system 100 comprises filter media 4 defining an interior 5. The filter media 4 comprises hydrophobic materials, e.g., melt blown polypropylene, spiral wound cellulose, nylon, glass, and/or can be selectively electrically charged, and may take various forms such as a cylindrical filter cartridge, for example. The flow rate of the filter media 4, in certain exemplary embodiments, may range from between about 0.25 liters per minute to about 20.0 liters per minute per 10 inch length and 2.5 inch diameter of filter and contact time of less than about 1 minute. Instead of a cross-flow filter system 3, a fixed bed of filter media also may be used; however, a cross-flow system with a radial flow design, for example, ensures high surface area and hence high flow and a small footprint when compared to a fixed-bed filter configuration.

In exemplary embodiments with cartridge configurations, the dimensions of each filter cartridge may be in the range of between about 5 inches to about 60 inches in length and between about 2.5 inches to about 6 inches in diameter. In exemplary embodiments with fixed-bed filter configurations, the flow rate may be in the range of between about 0.25 liters per minute to about 4 liters per min per 2.5 inch diameter. These dimensions may be significantly scaled up or down depending on the specific need, e.g., for industrial fixed installations. In other exemplary embodiments, other types of particulate filter capture systems are envisioned such as depth filters, multimedia filter systems, or sand-bed filters with flow from top to bottom or bottom to top. For a depth filter-like system, for example, the contact time may be between about 1 second to about 1 minute.

Returning to system 100, as the remainder of the liquid phase in the tank 1 is passed over 2 the filter media 4, the filter media 4 can capture all of the trace amounts of unprecipitated calcium sulfate hydrate+PFAS complex (es)—so long as the surface area and flow rates are managed—and the filter media 4 is maintained or replaced as needed. As the name implies, this is a cross-flow filter system wherein the liquid phase travels tangentially across the surface of the filter media 4, rather than into/through the filter media 4. The principal advantage of this arrangement is that filter cake—which can blind the filter—substantially is washed away during the filtration process, which increases the length of time that the filter media 4 can be effectively used. In this way, system 100 can operate as a continuous process, unlike batch-wise dead-end filtration systems. The resulting outlet liquid 10 coming out of the filter media 4 is the final treated aqueous stream, which has been substantially decontaminated of PFASs, and which can now exit the system 100.

As the aqueous stream has been hardened by the introduction of calcium ions via the anhydrite treatment, it is envisioned that the system 100 may additionally comprise a water softening subsystem for the final outlet treated aqueous stream 10. It also is envisioned that, once differential pressure in the filter media 4 has reached a predetermined stage, caused by the amount of unprecipitated calcium sulfate hydrate+PFAS complexes captured, the filter media 4 may be backwashed, reused, or disposed of. Other techniques that may be employed include alternating tangential flow, clean-in-place techniques, diafiltration, and/or process flow disruption.

Figure 2:
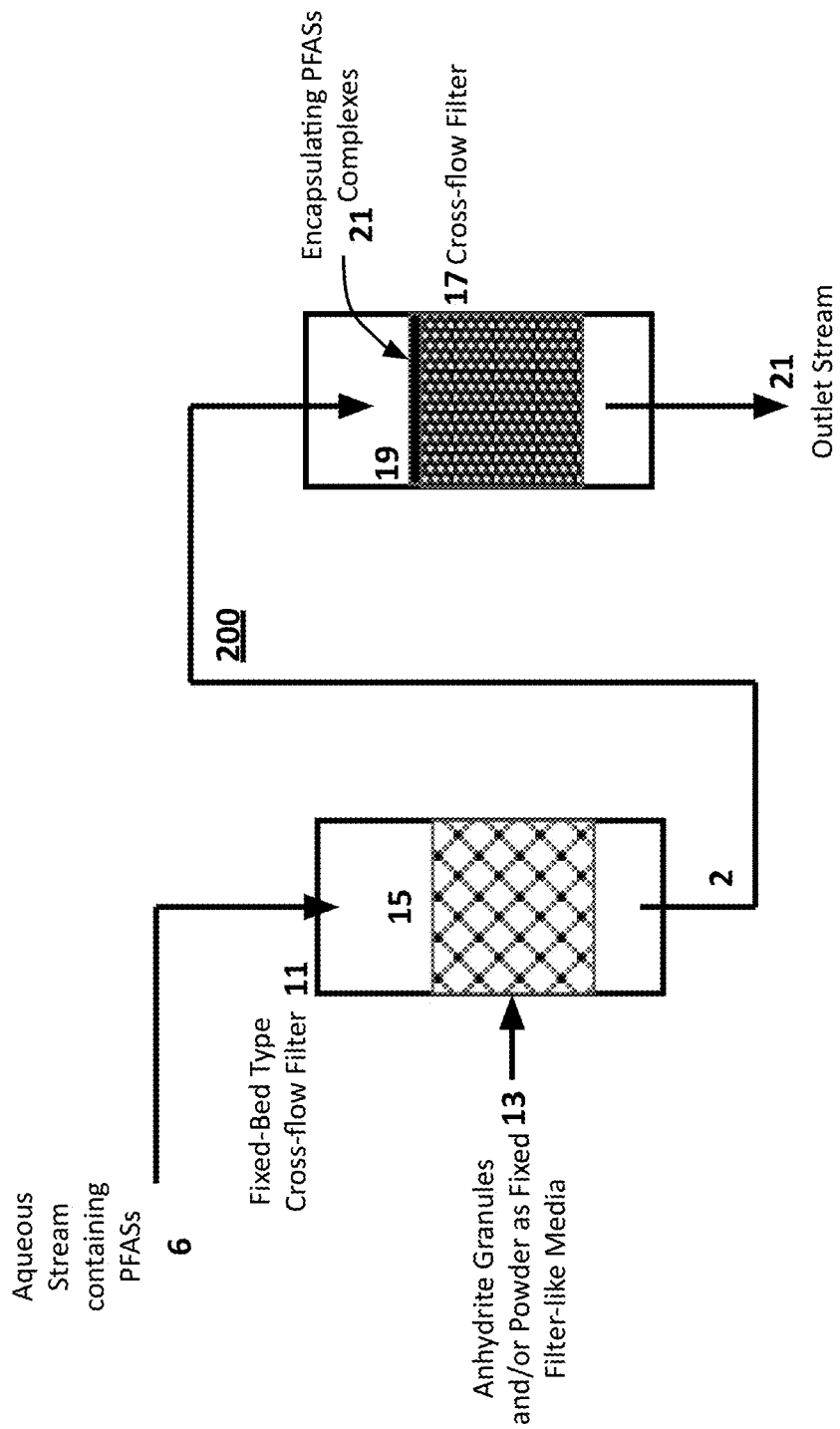
FIG. 2 is a schematic diagram of a second exemplary embodiment of a system for removing PFASs from a PFAS contaminated aqueous stream.

FIG. 2 is a schematic diagram of a sixth exemplary embodiment of the present invention. FIG. 2 illustrates a generalized system-structure and method steps 200 for removing PFASs from a PFAS contaminated aqueous stream. Like system 100, the system 200 has as much as 95% lower waste generation side-effects when compared to an integrated activated carbon filter.

For example, in comparison to an activated carbon system used for PFAS removal, for 1 pound of PFAS compounds removed from the aqueous stream, the estimated cost of activated carbon is about $450 U.S. dollars including cost of new activated carbon, replacement of spent carbon, and waste disposal of the spent carbon. This generates about 101 pounds of waste to be disposed of. In stark contrast, the system 100, for the same 1 pound of PFAS compounds removed from the aqueous stream, the estimated cost is around $100 U.S. dollars including consumables and disposal. This is about 75% reduction in estimated operating costs. The system 100 also generates less than about 7 pounds of waste, which is more than about 90% waste reduction. Further, the footprint of the system 100 is about 50% smaller than activated the carbon system, to achieve the same performance.

For purposes of the system 200 and the associated method, the PFAS contaminated feedwater 6 is processed via a fixed-bed type structure 11 configured to hold the flocculant. Like the system 100 structure, the feedwater 6 is fed via a pump, by gravity flow, by any other equivalent, or by any other method known to a person having ordinary skill in the art. The fixed-bed type structure 11 is configured as a cross-flow system but may be configured as a depth system or any other equivalent; however, regardless of the embodiment discussed, the anhydrite is held as part of the media, multi-media, cassette, and/or cartridge, etc. The anhydrite may be in the form of solid particles or granules, either hydrated or dry until the system is introduced to the feedwater 6. Flocculation begins to occur within the anhydrite media of the fixed-bed type structure 11, and downstream therefrom, via the positively charged calcium ions hydrated from the anhydrite media.

In exemplary embodiments with a depth configuration for the fixed-bed type structure 11, multiple porous layers of filter-like media are used to make contact with the PFAS contaminated feedwater 6. Due to the tortuous and channel-like nature of the filtration media, the feedwater 6 enters and interacts with the anhydrite within its structure, as opposed to substantially on or near the surface. A depth filter configuration provides the added advantage of attaining a high separation efficiency, and having the ability to be used with substantially higher flow rates. A depth filter configuration may comprise cassettes (pads or panels), cartridges, deep-beds such as sand filters, and lenticulars.

Returning to system 200, although the fixed-bed type structure 11 is illustrated in FIG. 2 to comprise a single media or a single fixed bed, it is envisioned that the PFAS contaminated feedwater 6 may flow through or along a series of interconnected and/or interrelated fixed-bed type structure(s) 11, and/or a series of agitation and flocculation tanks 1 like those of system 100. The system 200 also may comprise any other system known to a person having ordinary skill in the art for promoting interaction between the PFASs and the positively charged calcium ions hydrated from the anhydrite, e.g., percolators, bubblers, agitators.

The fixed-bed type structure 11 of system 200 receives a quantity of anhydrite and holds it as the primary flocculant. Like system 100, the quantity of anhydrite to be maintained or replenished in the fixed-bed type structure 11 of system 200 may be determined by a feedback system that takes into consideration of a least one of the measurable PFASs in the feedwater 6 (perfluoroalkylcarboxylic acids, perfluoroalkyl sulfonates, perfluoroalkyl sulfonic acids, and/or perfluorosulfonamido-acetic acids, for example), the initial and current quantity of anhydrite in the fixed-bed type structure 11, the measurable concentration of a least one of the measurable PFASs in the final outlet treated aqueous stream 10, etc.—to make most efficient use of the quantity of anhydrite introduced into and used by the system 200.

Again, as the insoluble calcium sulfate hydrate+PFAS complexes begin to agglomerate, they also begin to precipitate. Together, this directly facilitates substantial capture of the other PFASs in the feedwater 6 that may be of a type that do not/are not known to/have not been evidenced yet to interact with the positively charged calcium ions but would, nonetheless, still be bound-up by the calcium sulfate hydrate+PFAS complexes as they precipitate and/or agglomerate.

In the cross-flow configuration, the fixed-bed type structure 11 includes a filter-type media 13 comprising anhydrite granules and/or powder 15. In other exemplary embodiments, the filter-type media 13 essentially comprises anhydrite granules and/or powder. The cross-flow system 11 may take various forms such as that of planar filter(s) for a vessel or cylindrical filter cartridge(s) for a canister. In exemplary embodiments with cartridge configurations, the dimensions of each cartridge may be in the range of between about 5 inches to about 60 inches in length and between about 2.5 inches to about 6 inches in diameter. These dimensions may be significantly scaled up or down depending on the specific need, e.g., for industrial fixed installations.

Returning to the system 200, the contact time and the amount of anhydrite granules and/or powder 15 in the filter-like media 13 is adjusted based on the expected or anticipated PFAS concentration in the feedwater 6 and the flow rate of the feedwater 6—whether or not actively controlled. The contact time between the PFASs in the feedwater 6 and the anhydrite granules and/or powder 15 is between about 1 second to about 1 minute. With the feedwater 6 and the anhydrite granules and/or powder 15 in contact within the fixed-bed type structure 11, the generally insoluble anhydrite begins to hydrate and release positively charged calcium ions into the feedwater 6. The negative charge of the PFASs interact with the effectively positively charged and hydrated anhydrite to form calcium sulfate hydrate+PFAS complexes in the feedwater 6 within in the filter-like media 13 and downstream of the filter-like media 13.

From within, and upon exiting the fixed-bed type structure 11—as the barriers to aggregation are reduced by the nature of the calcium sulfate hydrate+PFAS complex—the calcium sulfate hydrate+PFAS complexes begin to agglomerate and to form floc; however, due to the force of the flow coming out of the fixed-bed type structure 11, none of the agglomerates or floc settle. Like system 100 of FIG. 1, the calcium sulfate hydrate+PFAS complexes are larger in size than the component parts, which makes them easier to capture physically or mechanically, e.g., makes them easier to simply filter-capture in a particulate filter without need for activated carbon filter systems or adsorbent beds, etc. The system 200 and the entire method from start to finish including precipitation and physical/mechanical capture removes upwards of 99.9 percent of the PFASs in the liquid phase.

Next, as flocculation begins to occur within the anhydrite fixed filter-like media 13 of the fixed-bed type structure 11 and downstream therefrom, the calcium sulfate hydrate+PFAS complexes are separated from the liquid phase exiting the fixed-bed type structure 11. Specifically, the liquid phase is passed over 2 an actually cross-flow filter 17 differently configured from the fixed-bed type cross-flow system 11. The cross-flow filter 17 is substantially identical to the cross-flow filter except for the difference described herein. Instead of a cross-flow filter system 17, a fixed bed of filter media also may be used; however, a cross-flow system with a radial flow design, for example, ensures high surface area and hence high flow and a small footprint when compared to a fixed-bed filter configuration.

Regardless of the specific configuration used, the cross-flow filter 17 can capture all of the unprecipitated calcium sulfate hydrate+PFAS complexes—so long as the filter media 19 cartridge, multimedia, sand bed, etc. and flow 2 are managed—and the encapsulating calcium sulfate hydrate+PFAS complexes 21 are removed, managed, and/or processed as needed. This may require removal and replacement of the filter media 19 and/or removal and processing of the encapsulating calcium sulfate hydrate+PFAS complexes 21. The flow rate of the filter media 4, in certain exemplary embodiments, may range from between about 0.25 liters per minute to about 20.0 liters per minute per 10 inch length and 2.5 inch diameter of filter and contact time of less than about 1 minute.

In exemplary embodiments with cartridge configurations, the dimensions of each filter cartridge may be in the range of between about 5 inches to about 60 inches in length and between about 2.5 inches to about 6 inches in diameter. In exemplary embodiments with simplified fixed-bed filter configurations, the flow rate may be in the range of between about 0.25 liters per minute to about 4 liters per min per 2.5 inch diameter. These dimensions may be significantly scaled up or down depending on the specific need, e.g., for industrial fixed installations. In one exemplary embodiment, other types of particulate filter capture systems are envisioned such as depth filters, multimedia filter systems, or sand-bed filters with flow from top to bottom or bottom to top. In another embodiment, the filter(s) may be installed as a single or multiround configuration holding multiple filters in one vessel depending on the flow capacity and pressure drop requirements.

In this way, the resulting outlet liquid stream 23 coming out of the filter media 19 of the cross-flow filter 17 is the final treated aqueous stream, which has been substantially decontaminated of PFASs, and which can now exit the system 200. As the aqueous stream has been hardened by the introduction of anhydrite, it is envisioned that the system 200 may additionally comprise a water softening subsystem for the final outlet liquid stream 23. It also is envisioned that, once differential pressure in the filter media 19 has reached a predetermined stage, caused by the amount of unprecipitated calcium sulfate hydrate+PFAS complexes captured, the filter media 19 may be backwashed, reused, or disposed of. Other techniques that may be employed include alternating tangential flow, clean-in-place techniques, diafiltration, and/or process flow disruption.

Example

The following is a non-limiting illustrative example of the present invention when applied under experimental conditions, for a PFAS contaminated aqueous stream, and the experimental results thereof, based on the system and method of FIG. 1.

The system used has an about 1 liter per minute feedwater intake containing about 1 ppm of PFASs (each; see Table 1). The primary agitation and flocculation tank has a capacity of about 10 liters. A quantity of anhydrite granules of about 2.0 milligrams (mg) is introduced into the feedwater. The feedwater functions as the inlet feed liquid for the 2.0 mg of anhydrite. The ratio of flocculant to expected quantity of PFASs in the tank ranges between about 0.3 to about 1000.

The primary agitation and flocculation tank mixes and agitates the feedwater with the anhydrite as flocculant. The tank forms gas bubbles or microbubbles in the feedwater and the anhydrite mixture. With the feedwater and the anhydrite mixed and agitated in the tank, the generally insoluble anhydrite begins to hydrate and interact with the PFASs to form calcium sulfate hydrate+PFAS complexes in the feedwater within the tank.

Upon cessation of the mixing and agitation of the feedwater and the anhydrite mixture in the tank, the calcium sulfate hydrate+PFAS complexes begin to either precipitate or aggregate. Some complexes resist precipitation and remain suspended in the feedwater. The tank has a residence time of about 5 minutes or greater to yield the majority of the precipitate product, which contains from between about 95% to about 99.9% of the PFASs that are in feedwater intake.

The precipitate is then separated from the remainder of the liquid phase in the tank, for further processing and drying, and for collection and weighing. The remainder of the liquid phase in the tank, after collection of the precipitate, contains the remaining about 0.05 mg to about 0.0001 mg of trace unprecipitated calcium sulfate hydrate+PFAS complexes.

Specifically, the liquid phase is passed into a cross-flow filter system comprising cylindrical filter media cartridge defining an interior outlet. As the remainder of the liquid phase in the tank is passed over the filter media, the filter media captures all or nearly all of the about 0.05 mg to about 0.0001 mg trace unprecipitated calcium sulfate hydrate+PFAS complexes. The resulting outlet liquid coming out of the filter media interior is substantially decontaminated of PFASs.

This is confirmed by the following experimental results presented as Table 1

TABLE 1

PFAS Chemical Removal Testing of Contaminated Aqueous Stream in parts per billion (ppb) (1 ppm = 1000 ppb)

| PFOS/PFAS chemicals in water (6) | Inlet (6) ppb | Outlet tank 1 (2) ppb | Outlet filter (10) ppb |
|---|---|---|---|
| Perfluorobutanesulfonic acid | 1000 | 0.048 | 0.044 |
| Perfluorobutanoic acid | 1000 | 0.041 | 0.046 |
| Perfluorodecanesulfonate | 1000 | 0.046 | ND |
| Perfluorodecanoic acid | 1000 | 0.044 | 0.0017 |
| Perfluorododecanoic acid | 1000 | 0.053 | ND |
| Perfluoroheptanesulfonate | 1000 | 0.048 | 0.0044 |
| Perfluoroheptanoic acid | 1000 | 0.042 | 0.023 |
| Perfluorohexanesulfonic acid | 1000 | 0.051 | 0.015 |
| Perfluorohexanoic acid | 1000 | 0.054 | 0.044 |
| Perfluorononanesulfonate | 1000 | 0.039 | ND |
| Perfluorononanoic acid | 1000 | 0.054 | 0.0046 |
| Perfluorooctanesulfonic acid | 1000 | 0.044 | 0.0027 |
| Perfluorooctanoic acid | 1000 | 0.055 | 0.0099 |
| Perfluorooctansulfonamide | 1000 | ND | ND |
| Perfluoropentanesulfonate | 1000 | 0.046 | 0.035 |
| Perfluoropentanoic acid | 1000 | 0.052 | 0.048 |
| Perfluorotetradecanoic acid | 1000 | 0.046 | ND |
| Perfluorotridecanoic acid | 1000 | 0.045 | ND |
| Perfluoroundecanoic acid | 1000 | 0.049 | ND |

The information in Table 1 illustrates (1) the feedwater concentrations of PFASs, in ppb, (2) the liquid phase in the tank, after collection of the precipitate, concentrations of PFASs, in ppb, and (3) the resulting outlet liquid coming out of the filter media concentrations of PFASs. ND indicates that the levels were not detectable by the current state of deployable technology and due to the extreme dilution of anything that might remain. Perfluorobutanesulfonic acid, Perfluorohexanesulfonic acid, and Perfluorooctanesulfonic acid are Perfluoroalkyl sulfonic acid. Perfluorodecanesulfonate, Perfluoroheptanesulfonate, Perfluorononanesulfonate, and Perfluoro-pentane sulfonate are Perfluoroalkyl sulfonates. N-ethyl perfluorooctanesulfon-amidoacetic acid is a Perfluorosulfonamidocarboxylic acids/Perfluorosulfonamido-carboxylates. Perfluoro butanoic acid, Perfluoro decanoic acid, Perfluoro dodecanoic acid, Perfluoro heptanoic acid, Perfluorohexanoic acid, Perfluorononanoic acid, Perfluorooctanoic acid, Perfluoropentanoic acid, Perfluorotetradecanoic acid, Perfluoro tridecanoic acid, and Perfluoro undecanoic acid are Perfluoroalkylcarboxylic acid/Perfluoroalkyl carboxylates.

Figure 3:
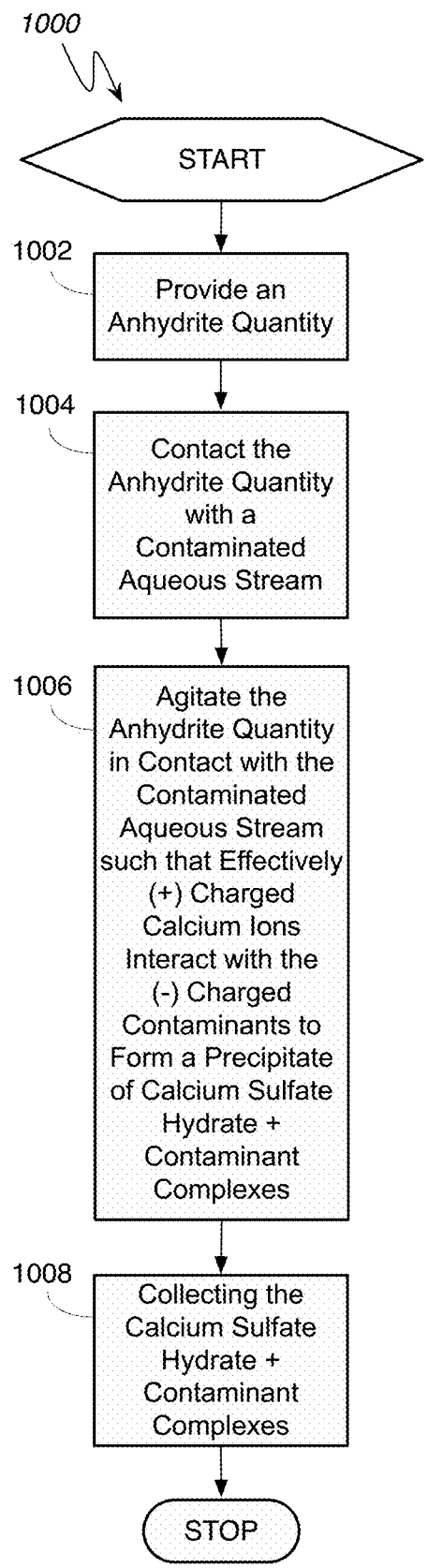
FIG. 3 is a flow diagram showing the steps of an Illustrative embodiment of a method of removing PFASs from a PFAS contaminated aqueous stream.

Turning now to FIG. 3, FIG. 3 is a flow diagram of an illustrative method 1000 according to an exemplary embodiment. The method 1000 discloses steps, not all of which are necessarily employed in each and every situation, but which may have similarities to other exemplary embodiments provided herein. The steps in the method 1000 may be performed in or out of the order shown. The method 1000 comprises the steps of: (1) providing an anhydrite quantity (1002); (2) contacting the anhydrite quantity with an aqueous stream contaminated with contaminants (1004); (3) increasing the kinetics of the anhydrite quantity in contact with the aqueous stream such that effectively positively charged calcium ions hydrate from the anhydrite and interact with the negatively charged contaminants to form a precipitate of calcium sulfate hydrate+contaminant complexes in the aqueous stream (1006); and (4) capturing the calcium sulfate hydrate+contaminant complexes in the aqueous stream via a particulate filter capture system comprising filter media (1008).

In some exemplary embodiments, the 1008 step may alternatively consist of collecting the precipitate of calcium sulfate hydrate+contaminant complexes in the aqueous stream that has settled out of solution or suspension. The collected product may take the form of a hard cement-like product when taken out of aqueous stream and dried. The collected product encapsulates the PFAS contaminants and exhibits insignificant leaching of the contaminant back into the environment when left exposed to nature.

The various embodiments are provided by way of example and are not intended to limit the scope of the disclosure. The described embodiments comprise different features, not all of which are required in all embodiments of the disclosure. Some embodiments of the present disclosure utilize only some of the features or possible combinations of the features. Variations of embodiments of the present disclosure that are described, and embodiments of the present disclosure comprising different combinations of features as noted in the described embodiments, will occur to persons with ordinary skill in the art. It will be appreciated by persons with ordinary skill in the art that the present disclosure is not limited by what has been particularly shown and described herein above.

What is claimed is:

1. A system for removal of contaminants from a contaminated aqueous stream, the system comprising:
   a) an agitation and flocculation system configured to receive an aqueous stream contaminated with contaminants, and configured to receive an anhydrite quantity as a primary flocculant, the agitation and flocculation system comprising a means for agitating the aqueous stream and mixing the aqueous stream with the anhydrite such that effectively positively charged calcium ions hydrate from the anhydrite and interact with negatively charged contaminants to form a precipitate of calcium sulfate hydrate+contaminant complexes in the aqueous stream, the agitation and flocculation system also configured to cease agitating and mixing the aqueous stream such that a portion of the calcium sulfate hydrate+contaminant complexes settle or are redirected under the influence of gravity, and such that a portion of the calcium sulfate hydrate+contaminant complexes resist the influence of gravity and remain suspended in a partially decontaminated aqueous stream; and
   b) a particulate filter capture system comprising filter media, and configured to receive the partially decontaminated aqueous stream and to capture the calcium sulfate hydrate+contaminant complexes that resist the influence of gravity and remain suspended in the partially decontaminated aqueous stream, wherein the partially decontaminated aqueous stream is flowed through the filter media to capture the remaining calcium sulfate hydrate+contaminant complexes to yield a decontaminated aqueous stream; and a feedback system configured to react to the concentration of at least one of a group consisting of perfluoroalkylcarboxylic acids, perfluoroalkyl sulfonates, perfluoroalkyl-sulfonic acids, and perfluorosulfonamidoacetic acids in the aqueous stream, and the concentration of at least one of the group consisting of perfluoroalkylcarboxylic acids, perfluoroalkyl sulfonates, perfluoroalkyl-sulfonic acids, and perfluorosulfonamidoacetic acids in the decontaminated aqueous stream.

2. The system for removal of contaminants of claim 1, wherein the anhydrite quantity comprises solid anhydrite particles or granules, either pre-moistened or dry, or a combination thereof.

3. The system for removal of contaminants of claim 1, wherein the anhydrite quantity is introduced into the aqueous stream via a liquid carrier.

4. The system for removal of contaminants of claim 1, additionally comprising a water softening system for softening the decontaminated aqueous stream.

5. A system for removal of contaminants from a contaminated aqueous stream, the system comprising:
   a) a fixed-bed cross-flow system configured to receive an aqueous stream contaminated with contaminants, and configured to hold an anhydrite quantity as a primary flocculant, the fixed-bed cross-flow system configured to bring into contact the aqueous contaminated stream with the anhydrite such that effectively positively charged calcium ions hydrate from the anhydrite and interact with negatively charged contaminants to form a precipitate of calcium sulfate hydrate+contaminant complexes in the aqueous stream, the fixed-bed cross-flow system also configured to discharge the contaminated aqueous stream with sufficient flow to carry the calcium sulfate hydrate+contaminant complexes and aqueous stream downstream without substantial precipitation or settling; and
   b) a particulate filter capture system comprising filter media, and configured to receive the contaminated aqueous stream and to capture the calcium sulfate hydrate+contaminant complexes suspended in the aqueous stream, wherein the contaminated aqueous stream is flowed through the filter media to capture the calcium sulfate hydrate+contaminant complexes to yield a decontaminated aqueous stream.

6. The system for removal of contaminants of claim 5, wherein the anhydrite quantity comprises solid anhydrite particles or granules, either pre-moistened or dry, or a combination thereof.

7. The system for removal of contaminants of claim 5, additionally comprising a feedback system configured to react to the concentration of at least one of a group consisting of perfluoroalkylcarboxylic acids, perfluoroalkyl sulfonates, perfluoroalkyl-sulfonic acids, and perfluorosulfonamidoacetic acids in the aqueous stream, and the concentration of at least one of the group consisting of perfluoroalkylcarboxylic acids, perfluoroalkyl sulfonates, perfluoroalkyl-sulfonic acids, and perfluorosulfonamidoacetic acids in the decontaminated aqueous stream.

8. The system for removal of contaminants of claim 5, wherein the fixed-bed cross-flow filter system comprises a cartridge filter media comprising the anhydrite quantity.

9. The system for removal of contaminants of claim 5, additionally comprising a water softening system for softening the decontaminated aqueous stream.

10. The system for removal of contaminants of claim 5, additionally comprising an agitation and flocculation system downstream of the fixed-bed cross-flow system and upstream of the particulate filter capture system.

11. The system for removal of contaminants of claim 10, wherein the agitation and flocculation system comprises at least one from a group consisting of stirring blades, baffles, vortex generators, liquid flow devices, and gas or air pumps for bubbles or microbubble generation, to increase the kinetics between the aqueous stream and the anhydrite quantity.

12. A method of removing contaminants from a contaminated aqueous stream, the method comprising:
  a) providing an anhydrite quantity;
  b) contacting the anhydrite quantity with an aqueous stream contaminated with contaminants;
  c) increasing the kinetics of the anhydrite quantity in contact with the aqueous stream such that effectively positively charged calcium ions hydrate from the anhydrite and interact with negatively charged contaminants to form a precipitate of calcium sulfate hydrate+contaminant complexes in the aqueous stream; and
  d) collecting the precipitate of calcium sulfate hydrate+contaminant complexes from the aqueous stream.

13. The method of removing contaminants from a contaminated aqueous stream of claim 12, wherein the collecting step comprises capturing the calcium sulfate hydrate+contaminant complexes in the aqueous stream via a particulate filter capture system comprising filter media.

14. The method of removing contaminants from a contaminated aqueous stream of claim 13, wherein the collecting step comprises drying the captured calcium sulfate hydrate+contaminant complexes.

15. The method of removing contaminants from a contaminated aqueous stream of claim 14, wherein the collecting step comprises processing the dried captured calcium sulfate hydrate+contaminant complexes.

16. The method of removing contaminants from a contaminated aqueous stream of claim 15, wherein the processing the dried captured calcium sulfate hydrate+contaminant complexes step comprises at least one from a group consisting of milling, grinding, and pulverizing the dried captured calcium sulfate hydrate+contaminant complexes.

* * * * *